United States Patent [19]
Semaan et al.

[11] Patent Number: 5,158,108
[45] Date of Patent: Oct. 27, 1992

[54] ELECTROPNEUMATIC CLOSED LOOP SERVO SYSTEM FOR CONTROLLING VARIABLE CONDUCTANCE REGULATING VALVES

[75] Inventors: Anthony J. Semaan, Fremont; A. J. Brenes, Castro Valley, both of Calif.

[73] Assignee: High Vacuum Apparatus Mfg., Hayward, Calif.

[21] Appl. No.: 754,545

[22] Filed: Sep. 4, 1991

[51] Int. Cl.$^5$ .......................................... G05D 16/20
[52] U.S. Cl. .................................. 137/487.5; 251/31
[58] Field of Search ................. 137/487.5, 488, 906, 137/486; 251/31

[56] References Cited

U.S. PATENT DOCUMENTS

| | | | |
|---|---|---|---|
| 2,574,414 | 11/1951 | Ragland | 137/906 X |
| 3,155,365 | 11/1964 | Hartung | 251/31 X |
| 3,225,785 | 12/1965 | Goike | 137/487.5 X |
| 4,307,750 | 12/1981 | Ledeen | 137/487.5 |

Primary Examiner—Alan Cohan
Attorney, Agent, or Firm—James E. Eakin

[57] ABSTRACT

A stand-alone electropneumatic closed loop servo system, with a separate gas supply to an air actuated cylinder, provides pressure, position, or fluid flow control of a variable conductivity valve in a device by automatically varying the conductance of the device. The air cylinder defines a control chamber and a smaller volume response chamber separated by a piston operatively connected to the variable conductivity valve. The gas supply includes a constant pressure line, with a pressure regulator valve and a check valve, into the control chamber and a variable pressure line, with a variable pressure solenoid valve, into the response chamber. A feedback signal from the device to a controller is compared to a desired pressure set point. The controller signals the solenoid to vary its output pressure thereby causing the piston to move accordingly to actuate the variable conductance valve. With an air spring in the control chamber and variable pressure in the smaller second chamber, the piston seeks equilibrium by moving in the direction of the side with the least pressure.

12 Claims, 3 Drawing Sheets

ELECTROPNEUMATIC CLOSED LOOP SERVO SYSTEM FOR CONTROLLING VARIABLE CONDUCTANCE REGULATING VALVES

FIELD OF THE INVENTION

This invention relates to pneumatically controlled servo driven variable conductance valving systems, particularly, to a stand-alone electropneumatic closed loop logic servo system employing a gas actuated cylinder to provide pressure, position or fluid flow control of variable conductance valving systems. The invention finds special application for controlling the pressure in a process chamber of a high vacuum environment by automatically controlling the pressure in the process chamber.

BACKGROUND OF THE INVENTION

Process chambers used in the semiconductor, physics research, surface and materials science industries are frequently required to accurately maintain predetermined pressures to successfully provide the proper environment that is best suited for the particular process.

Closed loop servo driven valves for maintaining predetermined pressures in process chambers are known in the prior art. Such valves are typically driven by a motor, such as a stepper motor.

Prior art closed loop, servo motor driven valves maintain a desired pressure with logic including a pressure transducer to provide a controller with an analog signal representing the pressure within the process chamber. The controller compares this signal to a predetermined set point pre-programmed into the controller, or communicated to it via a computer or an external analog input representing the desired pressure. The controller then typically sends a digital signal to the motor component of the valve to open or close the valve accordingly until the pump or compressor of the process chamber adjusts its output to produce a signal from the pressure transducer that is equal to the set point in the controller.

Inertia of the motor components may slow the closed loop adjustments. Additionally, oscillation may occur with the use of motor driven valves when the system searches for the set point because of the limited resolution of the digital output versus the analog input.

Because of the critical requirements of semiconductor processes and the like, secondary pneumatic valves or battery backups for the motor driven valves are typically required to quickly close and isolate the process in the event of a power failure. The use of backup equipment increases system cost and requires additional components that may generate particles which contaminate processes, reduce the conductance in the system, and increase maintenance operations.

As can be seen by the discussion of the prior art, and unsolved need exists for a pneumatic closed loop servo system for a variable conductance pressure regulating valve that overcomes the drawbacks of the prior art and provides both system pressure control and positive shutoff functions.

SUMMARY OF THE INVENTION WITH OBJECTS

A general object of the invention is to provide a electropneumatic closed loop servo system for variable conductance pressure regulating valves that overcomes the limitations and drawbacks of the prior art.

A specific object of the invention is to provide an electropneumatic closed loop servo system that controls both throttling and positive shutoff functions.

Another specific object of the invention is to provide an electropneumatic closed loop servo system that minimizes oscillation and vibrations in the process chamber to be controlled.

Yet another specific object of the invention is to provide a relatively inexpensive electropneumatic closed loop servo system that eliminates the need for a backup system and has few moving parts thereby reducing inertia effects, particle contamination and maintenance costs.

Still another specific object of the invention is to provide an electropneumatic closed loop servo system with feedback to rapidly and smoothly maintain the desired pressure in the process chamber thereby increasing the process output.

Yet one more object of the present invention is to provide a stand-alone electropneumatic closed loop servo system having a separate gas supply for an air actuated cylinder, the closed loop system used to provide pressure, position, or fluid flow control of a number of variable conductivity valving systems by automatically varying the conductance in the valving systems.

In accordance with the present invention, an electropneumatic closed loop servo driven variable conductance valving system is provided for controlling the pressure in a process chamber utilizing, for instance, a vacuum pump or a gas compressor to produce the desired chamber environment.

The electropneumatic closed loop servo system includes a controller, an air supply divided into a constant pressure line and a variable pressure line, and an air cylinder.

The air cylinder defines two pressurized chamber spaces separated by a displacement mechanism which defines a maximum stroke. The displacement mechanism includes a shaft which extends to a variable conductance valve at the process chamber.

The constant pressure air line includes a pressure regulator and extends to the first chamber. The pressure regulator maintains a constant air pressure to the first chamber. A check valve in the constant pressure line at the inlet to the first chamber prevents venting of air from the first chamber during volume changes therein, thereby causing the pressure in the first chamber to smoothly and steadily increase or decrease in response to movement of the displacement mechanism.

The variable pressure line includes a variable pressure solenoid valve and extends to an inlet into the second chamber. A pressure transducer, for instance, provides continuous feedback to a digital controller in the form of an analog signal representing the actual pressure in the process chamber. The controller compares the signal to a pre-programmed set point representing the desired pressure in the process chamber. A control signal from the digital controller causes the solenoid valve to vary the pressure in the variable pressure line input to the second chamber in response to the analog feedback signal from the process chamber.

In operation and with both chambers pressurized at equal pressure, the displacement mechanism will hold its position in the cylinder. By maintaining a constant pressure in the first chamber and increasing the pressure in the smaller second chamber above that of the first chamber, then the displacement mechanism will move in the direction of the side with less pressure. The converse will reverse the motion. As the controller changes its electrical control signal to the variable pressure solenoid valve, the output pressure of the solenoid valve changes accordingly. Changes in pressure caused by the response of the solenoid valve disrupt the equilibrium status of the air cylinder, and the displacement mechanism moves accordingly in search of equilibrium. The shaft attached to the displacement mechanism opens and closes the valve to the process chamber. The operation of the variable conductance process chamber valve causes the vacuum pump, or gas compressor, to vary its conductance to maintain the desired chamber environment.

The air pressure regulator in the constant pressure line reduces the input pressure at the constant pressure side of the air cylinder to approximately 50% of that of the main air supply pressure possible in the variable line. The volume of the first chamber is larger than the volume of the second chamber to ensure that the air pressure in the first chamber is always less than the maximum pressure in the main air supply line.

A position sensor is provided in the cylinder representing the position of the shaft of the displacement mechanism thereby providing alternatively for position control of the system versus the pressure control feedback provided by the signal from the pressure transducer.

These and other object, aspects, advantages and features of the present invention will be more fully understood and appreciated upon consideration of the following detailed description of a preferred embodiment, presented in conjunction with the accompanying drawings.

DESCRIPTION OF A PREFERRED EMBODIMENT

Figure 1:
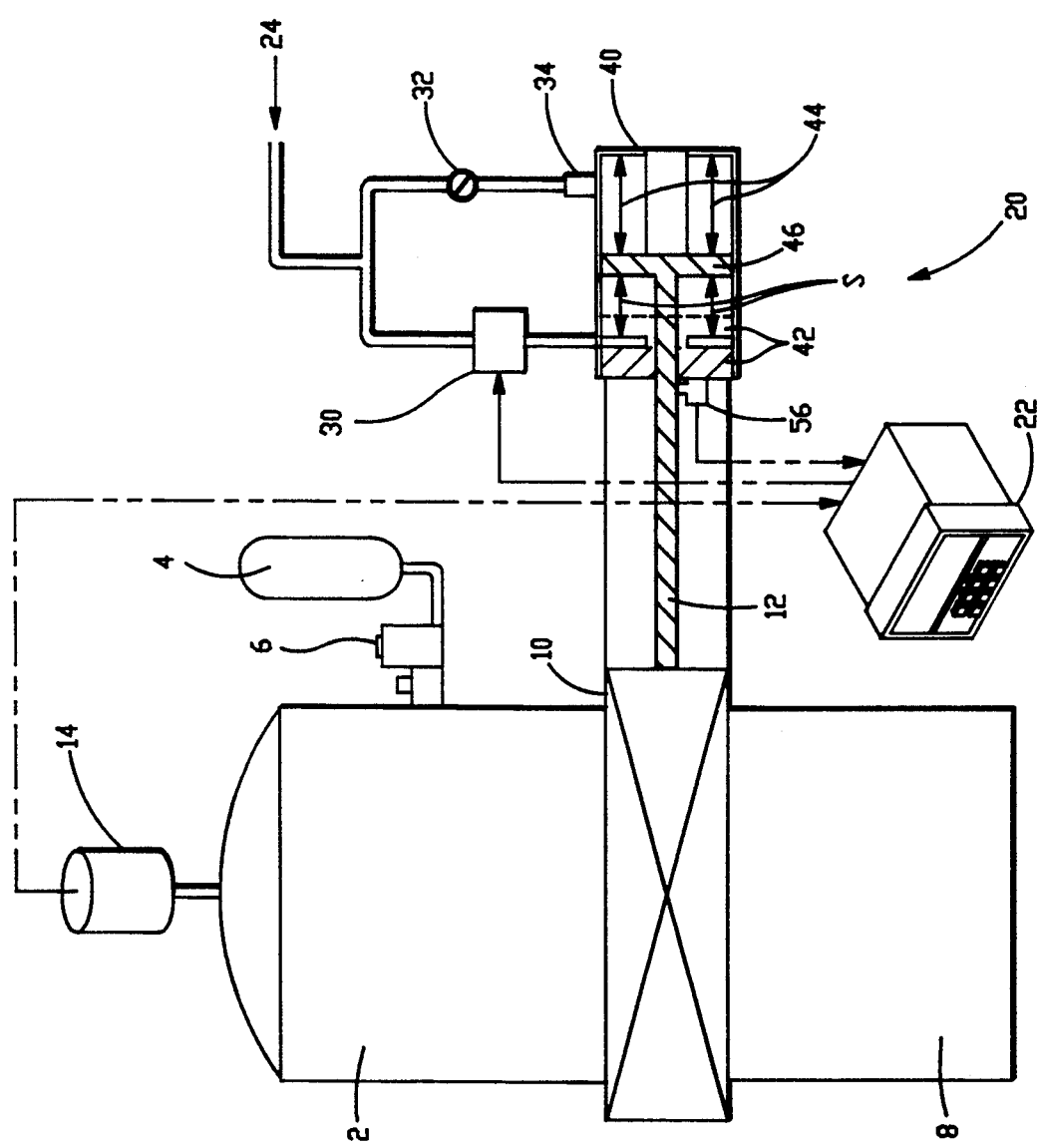
FIG. 1 is an environmental view in partial section showing the pneumatic closed loop servo system of the present invention used to control the variable conductance regulating valve in a high vacuum process chamber.

Referring to FIG. 1, a preferred embodiment of the pneumatic closed loop servo system of the present invention is shown generally at 20 controlling a variable conductance pressure regulating valve 10 in a process chamber 2 of a high vacuum apparatus for use in the semiconductor industry, for example.

The process chamber 2 includes a gas source 4 with a flow control mechanism 6. A vacuum pump 8, or alternatively a gas compressor, is included to provide the desired operating environment for the process chamber 2. The pressure regulating valve 10, a high vacuum gate valve for instance, is moved inwardly and outwardly by a shaft 12 between a fully opened and a fully closed position to, respectively, open and close off a passage into the process chamber 2. The conductance of the pump 8 gradually increases as the valve 10 gradually opens and decreases as the valve 10 gradually closes to seal off the passage.

The shaft 12 operates in response to the pneumatic closed loop servo system 20 of the present invention. A pressure transducer 14 monitors the pressure in the process chamber 2 and provides a continuous analog electrical feedback signal representing the actual pressure to the pneumatic closed loop servo system 20.

The pneumatic closed loop servo system 20 includes a controller 22, an air supply shown generally at 24, and an air cylinder 40.

In the pressure control mode for controlling the process chamber of FIG. 1, a digital controller 22, such as a Honeywell UDC-2000 Mini-Pro, is programmed by the user to accept and continuously monitor an analog electrical feedback input signal of, for example, 0 to 10 Vdc from the pressure transducer 14 representing the actual pressure in the process chamber 2. The pressure transducer 14 is of conventional design, for example a Baratron #122AA-00002AB manufactured by MKS Instruments.

A set point representing the desired pressure for the process chamber 2 is pre-programmed into the controller 22. The controller 22 continuously compares the input analog feedback signal to the set point.

The main air supply 24 is divided into a constant pressure line 26 and a variable control pressure line 28. The variable control pressure line 28 has an input into a conventional variable pressure solenoid valve 30 of the type capable of an output between 0-100% of the input pressure from the air supply 24, such as a Honeywell EPP3 solenoid valve. The solenoid valve 30 receives a continuous electrical analog signal from the controller 22 representing the difference between the set point and the process chamber pressure, or the ratio between the set point and the actual pressure of the process chamber. The solenoid valve 30 continuously varies the pressure of the variable control line 28 into chamber 42 in response to the signal from the controller 22.

It will be recognized by those skilled in the art that the present system enables the signal provided to the solenoid valve 30 to be either digital or analog.

The constant pressure line 26 includes a conventional pressure regulator 32 adjusted to maintain a constant pressure at its outlet, typically approximately one half of the input pressure from the main air supply 24. A one-way check valve 34 is placed at the inlet to the air cylinder 40.

The output of the variable pressure line 28 from the solenoid valve 30 extends to the air cylinder 40 which is separated into two chamber spaces, a response chamber space 42 and a control chamber space 44, by a displaceable piston 46. The piston 46 defines a maximum stroke, "S", within the cylinder 40. The variable control pressure line 28 ports into the response chamber 42 thereby supplying a variable amount of air to chamber 42 in accordance with the operation of the solenoid valve 30. The constant pressure line 26 ports lower pressure air into the control chamber 44 which defines a larger volume than chamber 42.

Figure 3:
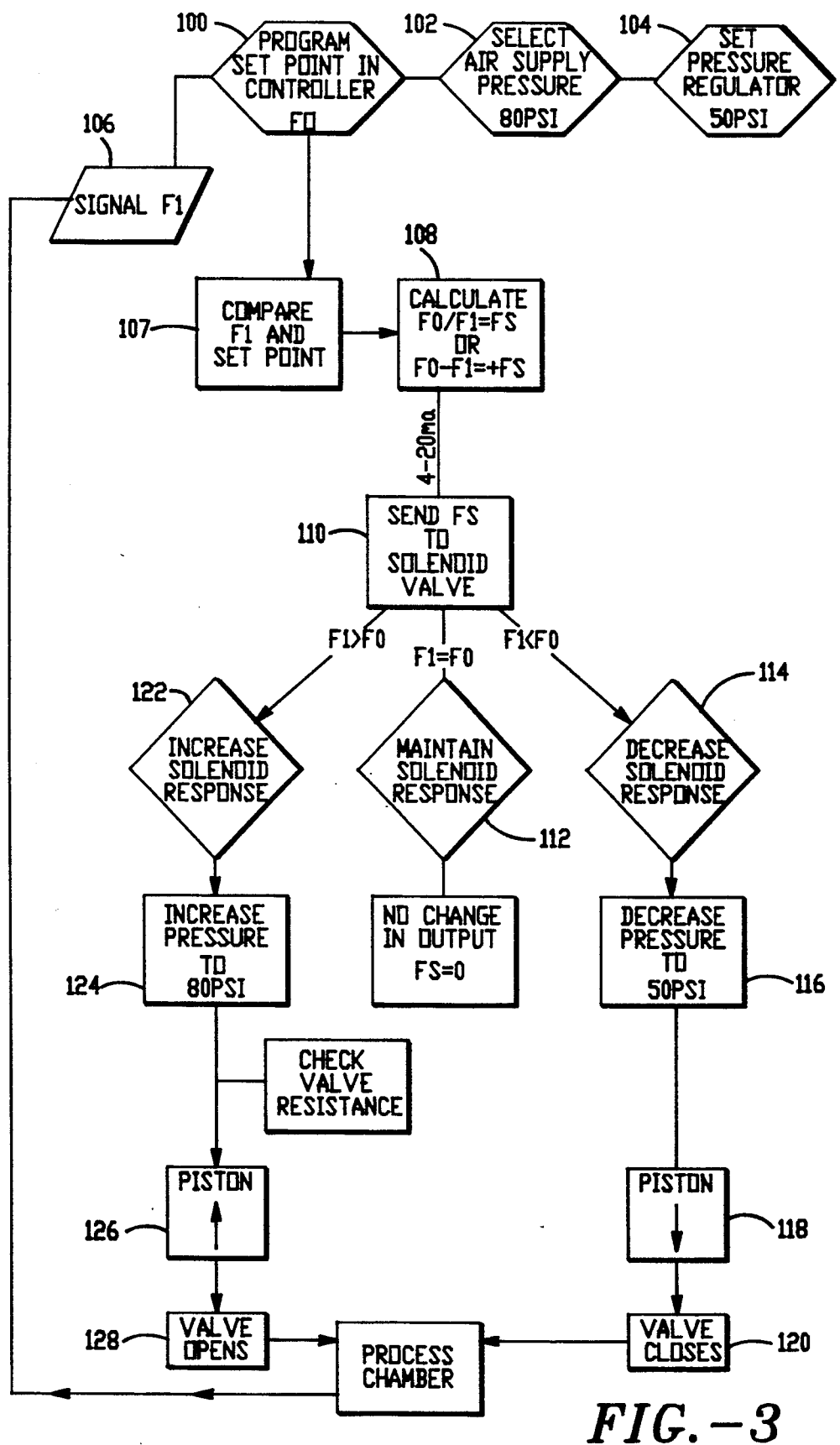
FIG. 3 is a block diagram showing the logical control of the system.

As can be seen by the FIGS. 1 and 3, and the above discussion, the system 20 is a stand-alone system operated independently from the media to be controlled by gas supply 24. The stand-alone system 20 enables the pneumatic cylinder 40 to be used to control any variable conductance environment, including pressure, position, or fluid flow control environments.

A typical sequence of operations for controlling the valve 10 in the FIG. 1 embodiment is shown in FIG. 3. At step 100, the pre-selected and desired set point (FO) for the operating pressure in the process chamber 2 is programmed into the controller 22. The main air supply 24 is selected and set to provide approximately 80 PSI input in variable line 28 at step 102. At step 104, the pressure regulator 32 is adjusted to provide for an output pressure in the control line 26 of approximately one half the input pressure, or approximately 40 to 50 PSI, the pressure needed to close and seal the process chamber.

At step 106, a 0 to 10 Vdc analog feedback signal (F1) from the pressure transducer 14 is fed into the controller 22 and compared to the set point FO in the controller 22 at step 107. A differential analog control signal (FS) is computed in the controller at step 108. Based upon the computed FS signal, the controller 22 either maintains, increases, or decreases a 4 to 20 mA, or 0 to 10 volt, analog control signal which is transmitted to the solenoid valve 30 at step 110.

The response of the solenoid valve 30 depends upon the incoming control signal from the controller 22. As shown in step 112, when the process chamber pressure is equal to the desired set point (F1=F0), the controller 22 will maintain the same control signal to the variable pressure solenoid valve 30 which will maintain its operating output pressure. The air pressure into the chamber 42 remains constant, and no change occurs in the position of the piston 46, the position of the valve 10, and the output of the pump 8 because the pressure in the two chambers 42 and 44 is at equilibrium.

As shown in step 114, the pressure in the process chamber is lower than the desired set point (F1<F0). The controller 22 decreases its signal to the solenoid valve 30 to lower its output at step 116. The air pressure into chamber 42 decreases causing the piston 46 to move downwardly at step 118. At step 120, the movement in the shaft 12 causes the valve 10 to begin to close thereby decreasing the conductance of the vacuum pump 8 to increase the pressure in the process chamber 2 to approach the desired set point.

At step 122, the process chamber pressure has increased beyond the desired set point (F1>F0). The controller 22 increases its signal to the solenoid valve 30 which in turn maximizes its output to 80 PSI thereby increasing the air pressure in chamber 42 at step 124. At step 126 the piston 46 moves upwardly into the chamber 44 as the pressure increases. The check valve 34 prevents venting from the chamber 44 thereby causing compression of the air to create an air spring effect in chamber 44. During step 126 the constant feedback feature of the system 20 signals the controller 22 to signal the solenoid valve 30 to increase its output to compensate for the predictable resistance caused by the air spring effect. The resistance created by the air spring prevents oscillation in the air cylinder 40 from stiction. The larger volume of the chamber 44, the lower constant air pressure input into chamber 44, and the maximum stroke of the piston 46 prevents the pressure of the compressed air in chamber 44 from exceeding the maximum input pressure from the main air supply 24. At step 128, the valve 10 begins to open causing the vacuum pump 8 to increase its conductance thereby decreasing the pressure in the process chamber 2. The constant feedback feature from the process chamber 2, to the controller 22 and thence to the solenoid valve 30, creates a continuously updated output from the solenoid valve 30.

It can be seen that the positive shut off feature of the pneumatic closed loop servo system 20 of the present invention is provided by the provision of the check valve 34, and by setting the control pressure in line 26 to the minimum pressure required to close and seal the valve 12. For the above described embodiment, that pressure is approximately 50 PSI. Operation of the valve 10 to control the process chamber 2 requires a pressure of approximately 80 PSI in the variable pressure line 28 thereby resulting in a normally compressed condition in chamber 44. In the event of a power failure, the equilibrium seeking piston 46 will move downwardly in response to decompression in the air spring chamber caused by venting through the solenoid valve 30 thereby causing the shaft to move downwardly so that the valve 10 will seal the chamber. The check valve prevents exhaustion of air from the chamber 44 and the valve 10 remains closed until power can be restored.

Figure 2:
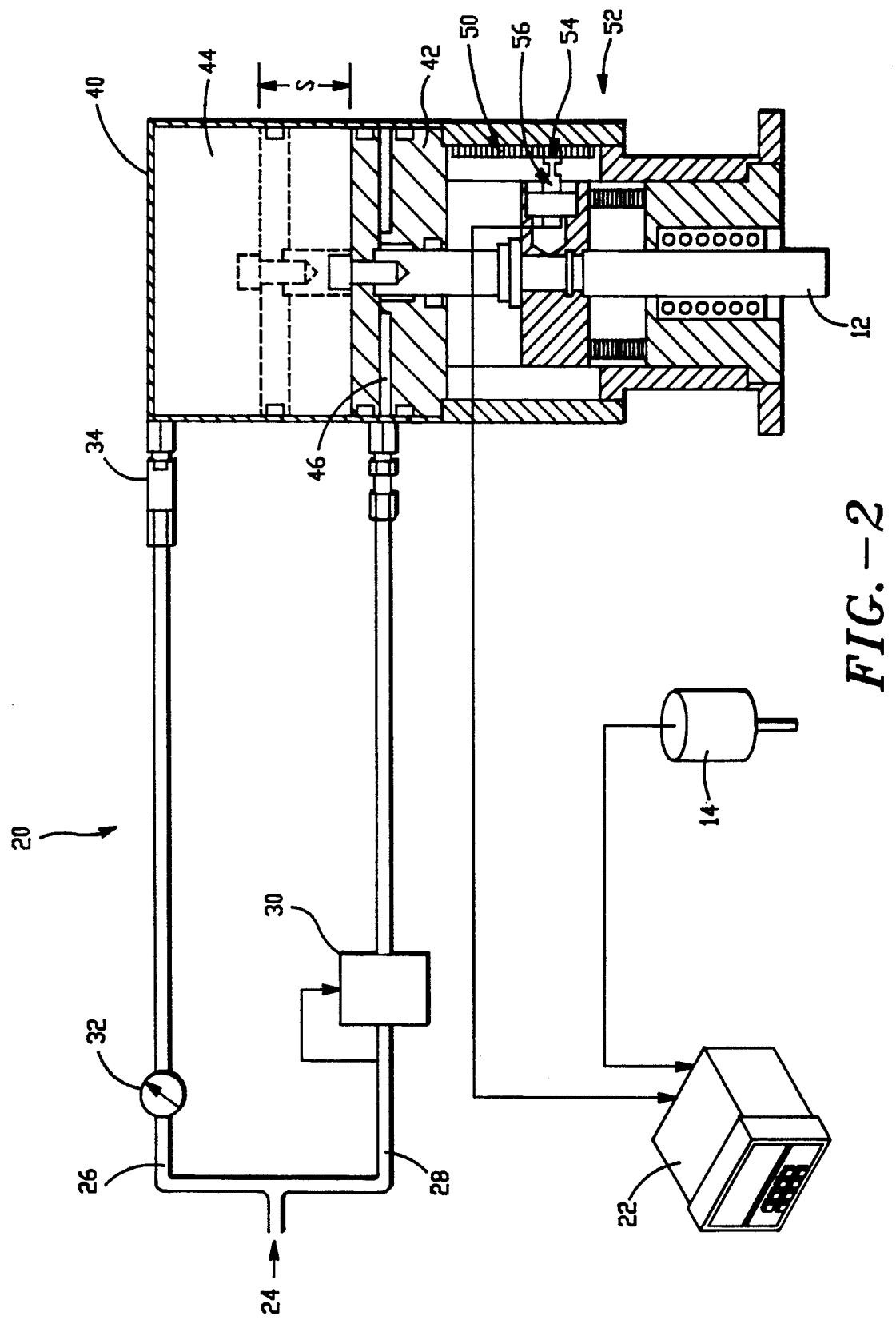
FIG. 2 is an enlarged view of the pneumatic closed loop servo system of the present invention showing the air cylinder in section.

Referring now to FIG. 2, the pneumatic closed loop variable conductance servo system 20 of the present invention may also be used for position control. A rack 50 is placed within a stainless steel high vacuum housing 52. The shaft 12 is axially aligned within housing 52. A pinion 54 includes a sensor 56 for sensing the position of the shaft 12. The sensor communicates an analog positional signal, for instance, from 4 to 20 mA, to the controller 22 which, in turn, signals the difference from the desired position to the solenoid valve.

It will be recognized by those skilled in the art that the feedback signal provided to the controller may also be from a computer, a flow transducer, or any other input source. The signals may be analog or digital and a mechanical spring may be used in lieu of the check valve 34. The dimensions of the larger control chamber remain relative to the variable pressure chamber with differing applications and the need for larger cylinders and different air pressures. The pneumatic closed loop servo system of the present invention may be used to control any variable conductance valving system.

What is claimed is:

1. A pneumatic closed loop servo system for controlling a variable conductance valve in a process chamber having a predetermined operating condition, the system comprising:
   a controller means;
   an input source from the process chamber for providing a feedback signal to the controller means, the feedback signal representing an actual condition in the process chamber;
   a main air source, the air source dividing into a constant pressure line and a variable pressure line;
   the constant pressure line including a pressure regulator means and a check valve means;
   the variable pressure line including a variable pressure valve means;
   a cylinder means defining two chambers separated by a displacement means, the first chamber supplied with air from the constant pressure line and the second chamber supplied with air from the variable pressure line; and
   a shaft means attached at a first end to the displacement means and at a second end to the variable conductance valve means, the variable conductance valve means operating in response to movement of the shaft means to maintain the predetermined operating condition in the process chamber.

2. A pneumatic closed loop servo system for controlling a variable conductance valve in a process chamber having predetermined operating condition, the system comprising:
- a controller means;
- an input source from the process chamber for providing a feedback signal to the controller means;
- a main air source, the air source dividing into a constant pressure line and a variable pressure line;
- the constant pressure line including a pressure regulator means and a check valve means;
- the variable pressure line including a variable pressure valve means;
- a cylinder means defining two chambers separated by a displacement means, the first chamber supplied with air from the constant pressure line and the second chamber supplied with air from the variable pressure line; and
- a shaft means attached at a first end to the displacement means and at a second end to the variable conductance valve means, the variable conductance valve means operating in response to movement of the shaft means and for maintaining the predetermined operating condition.

3. A pneumatic closed loop servo system for controlling pressure, position or fluid flow operations of a variable conductance valve in a downstream device, the closed loop servo system comprising:
- a controller means for receiving an input from the downstream device and for providing a feedback signal in response to the input;
- a main gas source dividing into a constant pressure line having a constant gas pressure and a variable pressure line having a variable gas pressure;
- a pressure regulator means in the constant pressure line for maintaining the constant gas pressure;
- a variable pressure valve means for controlling the variable pressure in the variable pressure line in response to the feedback signal from the controller means;
- a cylinder means defining two chambers separated by a displacement means, the first chamber having an inlet port and connected to the constant pressure gas line, the second chamber connected to the variable pressure gas line;
- a check valve means at the inlet port for avoiding venting; and
- a shaft means adapted to connect the displacement means to the variable conductance valve.

4. The pneumatic servo system of claim 3 wherein the constant gas pressure entering the first chamber from the constant pressure line is less than a pressure of the main air source.

5. The pneumatic servo system of claim 4 wherein the displacement means is a piston defining a maximum stroke within the cylinder means.

6. The pneumatic servo system of claim 5 wherein the check valve means prevents air from exhausting from the first chamber during movement of the piston.

7. The pneumatic servo system of claim 6 wherein the first chamber means defines a volume larger than a defined volume in the second chamber; the larger volume of the first chamber together with the lower gas pressure in the constant pressure line, the check valve means creating an air spring effect within the first chamber, and the maximum stroke of the piston, maintaining an gas pressure in the first chamber at all times lower than a maximum pressure of the gas source.

8. The pneumatic servo system of claim 7 wherein the maximum pressure obtainable in the air spring effect chamber does not exceed the maximum pressure of the gas source.

9. The pneumatic servo system of claim 3 wherein the input is from a pressure transducer means.

10. The pneumatic servo system of claim 3 wherein the input is from a position sensor means.

11. The pneumatic servo system of claim 3 wherein the variable pressure is from a solenoid valve.

12. The closed loop servo system of claim 3 wherein the controller receives a signal from a sensor for continuously sensing the position of the shaft means.

* * * * *